April 28, 1942.    G. R. DEMPSTER    2,281,183
TRANSPORTING AND DUMPING DEVICE
Filed April 27, 1940        6 Sheets-Sheet 1

Inventor
George R. Dempster.
By Cameron, Kerkam & Sutton
Attorneys

April 28, 1942.                G. R. DEMPSTER                2,281,183
                    TRANSPORTING AND DUMPING DEVICE
                    Filed April 27, 1940          6 Sheets-Sheet 2

Inventor
George R. Dempster
By Cameron, Kerkam + Sutton
Attorneys

April 28, 1942.　　　G. R. DEMPSTER　　　2,281,183
TRANSPORTING AND DUMPING DEVICE
Filed April 27, 1940　　　6 Sheets-Sheet 3

Inventor
George R. Dempster.

By Cameron, Kerkam + Sutton.
Attorneys

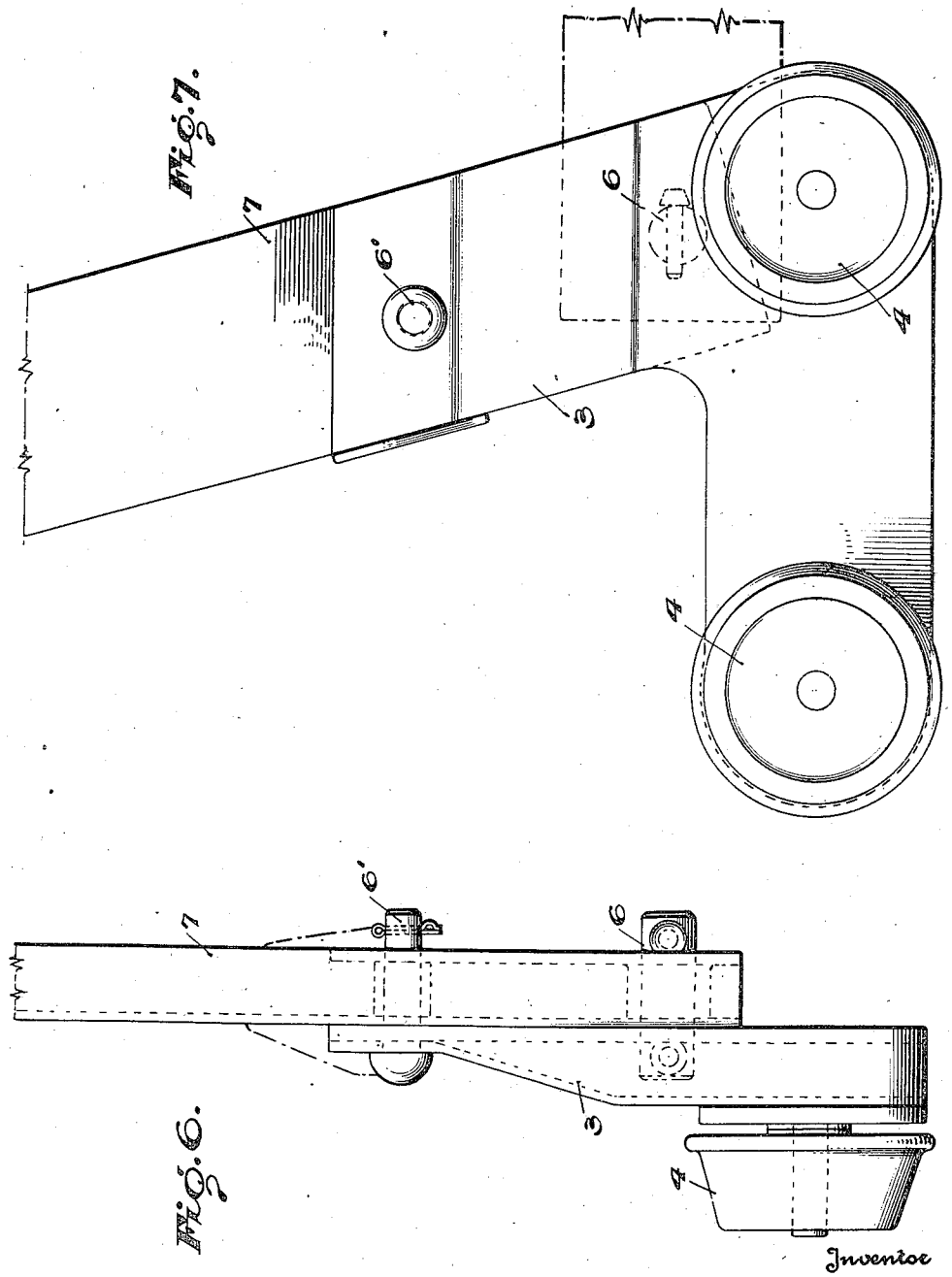

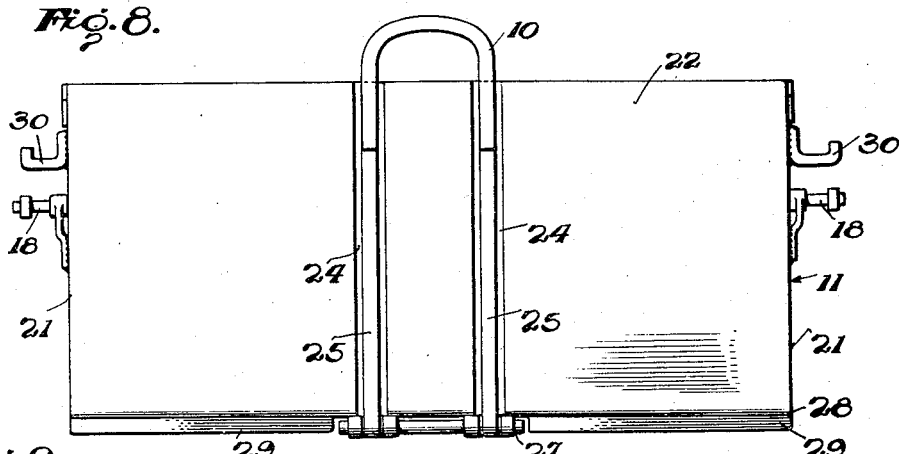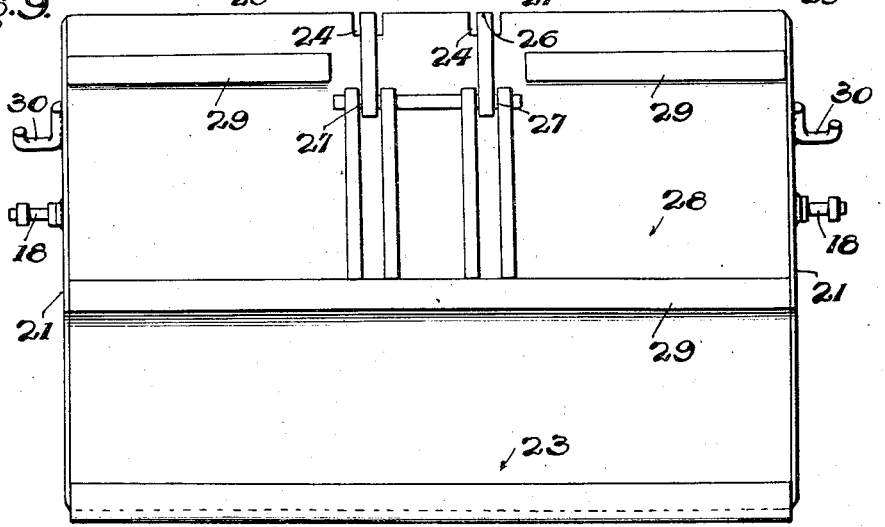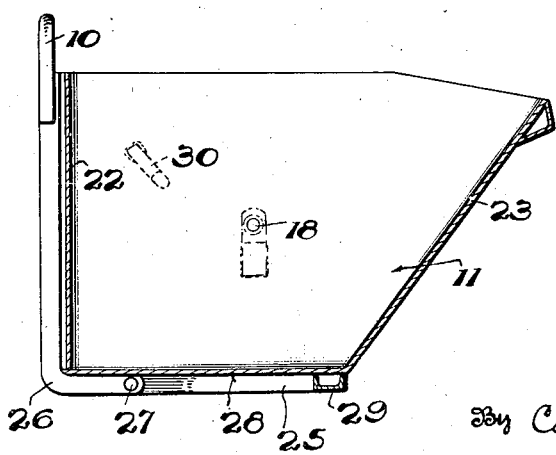

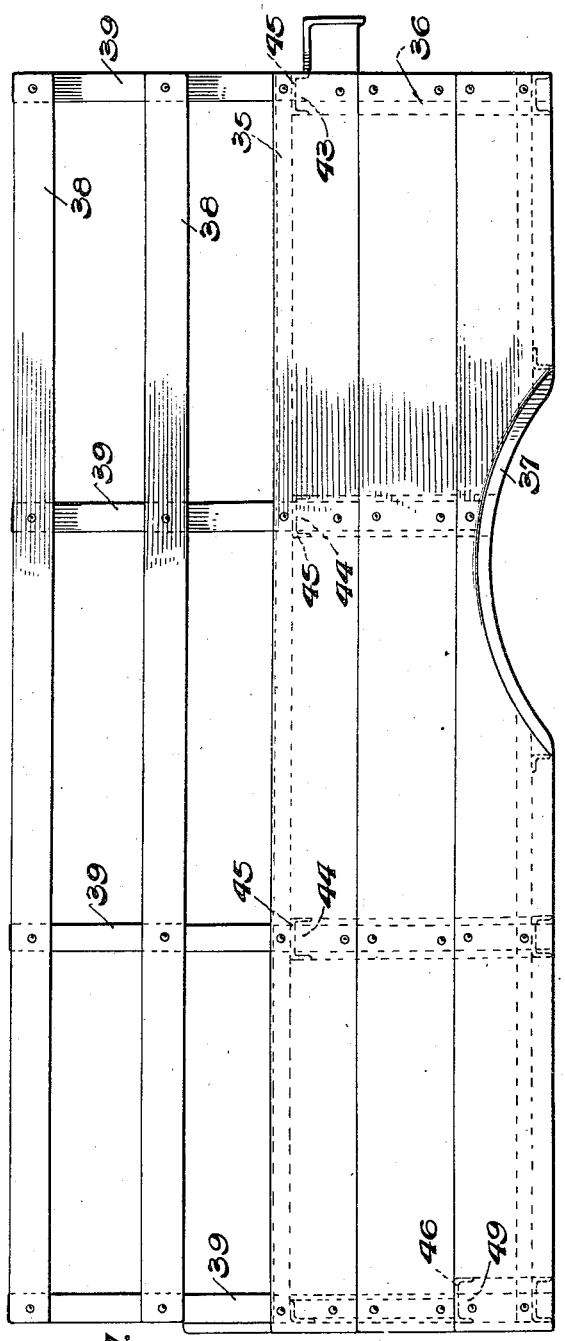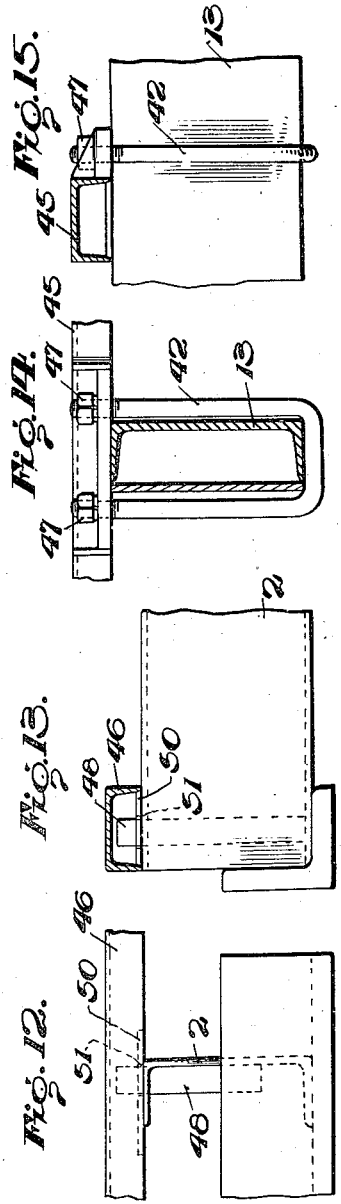

Patented Apr. 28, 1942

2,281,183

UNITED STATES PATENT OFFICE 2,281,183

TRANSPORTING AND DUMPING DEVICE

George R. Dempster, Knoxville, Tenn.

Application April 27, 1940, Serial No. 332,041

17 Claims. (Cl. 214—77)

This invention relates to transporting and dumping devices and has for its object to simplify the construction and operation of such devices and to place the load on said device during transportation on or forward of the axle of the truck or other vehicle upon which the device is mounted.

Another object of this invention is to provide a transporting and dumping device which may be utilized as a transporting or dumping device or which may be readily adapted to accommodate any desirable type of vehicular body.

Another object of this invention is to provide a novel container for use with the transporting and dumping device of the present invention.

The inventive idea is capable of receiving a variety of mechanical expressions, one of which, for the purpose of illustrating the invention, is shown in the accompanying drawings, in which:

Fig. 6 is an end view of a portion of the skid traveler used with the present invention;

Fig. 7 is a side view of a portion of the skid traveler used with the present invention;

Fig. 8 is a front view of a suitable container for use with the transporting and dumping vehicle of the present invention;

Fig. 9 is a bottom view of the container shown in Fig. 8;

Fig. 10 is a sectional elevation of the container shown in Fig. 8;

Fig. 11 is a side view of a suitable vehicular body for use with the transporting and dumping vehicle of the present invention;

Fig. 12 is an enlarged detail of a portion of the vehicular body shown in Fig. 11;

Fig. 13 is another view of the detailed structure shown in Fig. 12;

Fig. 14 is an enlarged detail of the means securing the vehicular body to the transporting and dumping vehicle of the present invention; and Fig. 15 is another view of the detail shown in Fig. 14.

Figure 5:
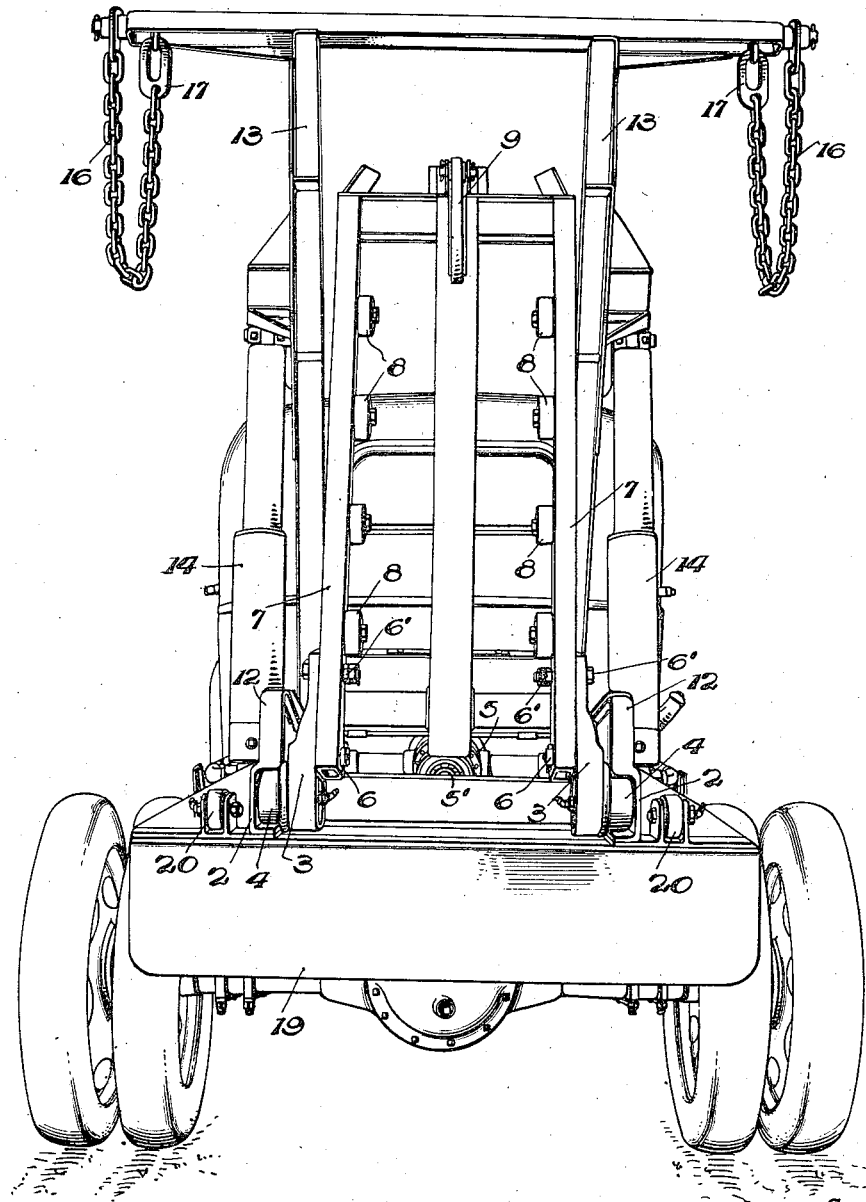
Fig. 5 is a view of said embodiment from the rear showing the several parts in upright position.

Referring to the drawings in which like reference characters indicate like parts throughout the several views, 1—1 indicate side rails of a truck chassis, and 2—2 indicate angle bars, here shown as in the form of channel bars mounted upon and secured to the said chassis rails 1—1 in any suitable way, with the channel face of the angle bars facing inwardly, as clearly shown in Fig. 5. These angle bars 2—2 constitute a track or way extending forwardly from the rear end of the truck, and mounted on this track or way is a skid traveler 3 (Figs. 5, 6 and 7) provided with rollers 4—4 traveling along the track or way constituted by the angle bars 2—2. Suitable power mechanism, here shown as a horizontal cylinder 5 (Fig. 5), is mounted on the truck chassis forward of the skid traveler 3 with the piston rod 5' thereof connected to the skid traveler 3 in such a way that the skid traveler 3 will be positioned at the rear end of the track bars 2—2 and the chassis rails 1—1 when the piston rod is extended but when the piston rod is moved forward, i. e., forward of the truck, the skid traveler 3 will occupy the position shown in Fig. 1.

Skid traveler 3 has pivotally mounted thereon, as at 6 (Figs. 5, 6 and 7), suitable upwardly extending skid frames 7 preferably somewhat forwardly inclined and held in position by removable bolts 6'. Skid frames 7 are provided with suitable rollers 8 to engage the back of the container and are provided with a suitable automatic hook or catch 9 mounted at or near their tops in position to engage a bail 10 of a suitable container 11 when said container is elevated to a point where its bottom portion is above the rails 2—2 on the track or way. This hook or catch is of such construction that when the container reaches the lifted position the hook engages and supports the container. If, however, the container be slightly further raised and then lowered the bail 10 passes the engaging end of the catch or hook 9 and is free to be lowered.

Suitable forwardly sloping supporting members 12 are secured to the angle bars 2—2 to receive the container 11 when in transporting position to distribute the weight of the container and contents upon the truck chassis and upon the skid frames 7 to steady the load in transit.

Figure 3:
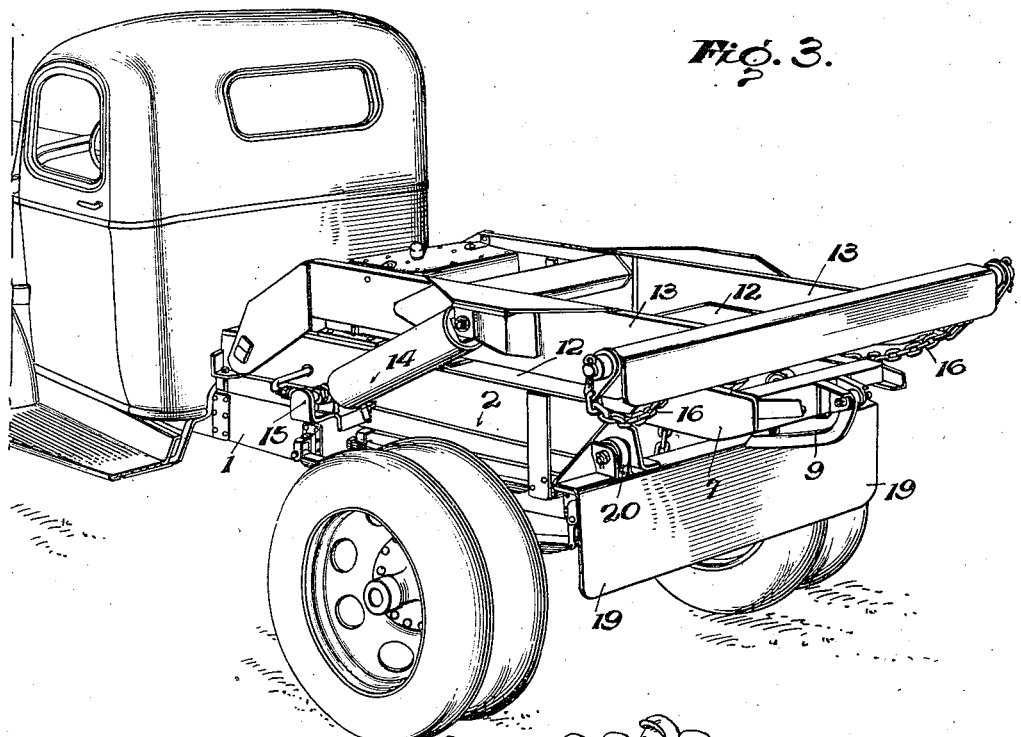
Fig. 3 is a view of said embodiment with the parts in position to receive a vehicular body.

Pivotally supported on the angle bars 2—2 forward of the rear end of the chassis is a boom composed of a pair of oppositely disposing parallel boom arms 13, each arm 13 having pivotally connected thereto the piston rod of a cylinder 14, the lower ends of these cylinders being pivotally mounted, as at 15, on the angle bars 2—2. When the boom 13 is in elevated position, the cylinders 14 are preferably in a substantially vertical position. Boom 13 is designed, when in lowered position, to rest upon angle bars 2—2 and is suitably cut away to receive the supporting members 12 (Fig. 3).

Suspended from the rear end of the boom 13 are chains 16 having suitable means, here shown as slotted plates 17, for engaging the sides of the container 11 for the purpose of elevating the same, suitable lugs 18 being provided on the sides of the container 11 to receive the slotted plates 17. Chains 16 carry the weight of the container 11 and contents during elevating operations and in fact at all times except when the container 11 rests upon members 12. When the bail 10 is engaged by the hook or catch 9, hook or catch 9 assists chains 16 in supporting container 11.

The rear end of the truck chassis is protected by a downwardly extending member or apron 19 extending from the rear end of the angle bars 2—2 and having suitable rollers 20 mounted thereon. Apron 19 and rollers 20 constitute a stationary part of a skid upward and along which the container 11 is elevated, the rear faces of the skid frames 7 constituting a movable part, as heretofore described.

Figs. 8—10 show a suitable container for use with the transporting and dumping device of the present invention. This container 11 comprises two side walls 21, a rear wall 22, an upwardly and outwardly sloping forward wall 23 and a bottom 28. Rear wall 22 is provided with vertically disposed grooves 24 designed to receive the parallel arms 25 of the bail 10. Arms 25 of bail 10 are inwardly turned as at 26 and are pivoted at 27 to the bottom 28 of the container 11. Bottom 28 is provided with reenforcing members 29 to reenforce and to support the container when on the ground. As is readily apparent, bail 10 is so arranged with respect to pivot 27 that when the container 11 is on the ground the weight of the container is disposed upon the reenforcing members 29 and upon the portions 26 of the bail 10. By this arrangement bail 10 is always secured in raised position with arms 25 in grooves 24 when the container is on the ground. Container 11 is likewise provided with deflecting pins 30 on side walls 21 disposed above lugs 18 and toward rear wall 22. Deflecting pins 30 are provided to engage the chains 16 when container 11 is in dumping position to provide the chains 16 with a better leverage for righting container 11 after its contents have been dumped.

When container 11 is on the ground and it is desired to elevate the same with its load, the boom 13 is lowered and plates 17 engaged with lugs 18. Power, preferably oil under pressure, is admitted to the lower ends of cylinders 14 whereby the boom 13 is elevated and the container raised along skid frames 7 to its highest position. The end of boom 13 has now moved forwardly in its arc of movement and chains 16 are at an angle off the vertical with reference to container 11, thus creating a forward pressure on skid frames 7. Cylinder 5 is then opened and container 11 pushing against skid frames 7 forces the oil out of cylinder 5, permitting skid frames 7 to move forward in tracks 2 to the position where chains 16 are vertical. When this position is reached the boom 13 is actuated and container 11 lowered into the position shown in Fig. 1 resting upon members 12 and skid frames 7. In this position the load is preferably over or nearly over the rear axle of the truck and is ideally disposed for transportation.

When the dumping position is reached, boom 13 is raised, elevating container 11 along skid frames 7. Oil under pressure is then admitted to the rear end of cylinder 5, moving skid frames 7 and container 11 rearwardly until the rear faces of skid frames 7 are in line with apron 19. Bail 10 of container 11 is then engaged in catch 9. Boom 13 is then lowered and as bail 10 is still engaged by catch 9 container 11 rotates about the pivots 27 and the contents of container 11 are dumped. Rotation of container 11 about the pivots 27 brings chains 16 into engagement with deflecting pins 30 providing an increased leverage for righting container 11 after its contents have been dumped.

Figure 1:
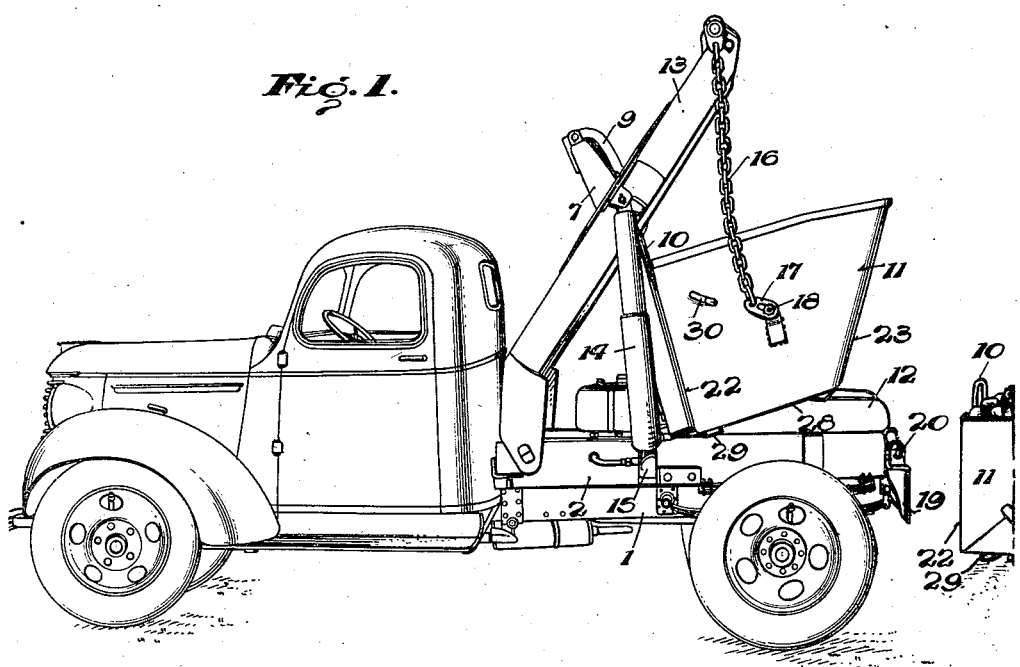
Fig. 1 is a side elevation of one embodiment of the invention with the parts in transporting position.
Figure 2:
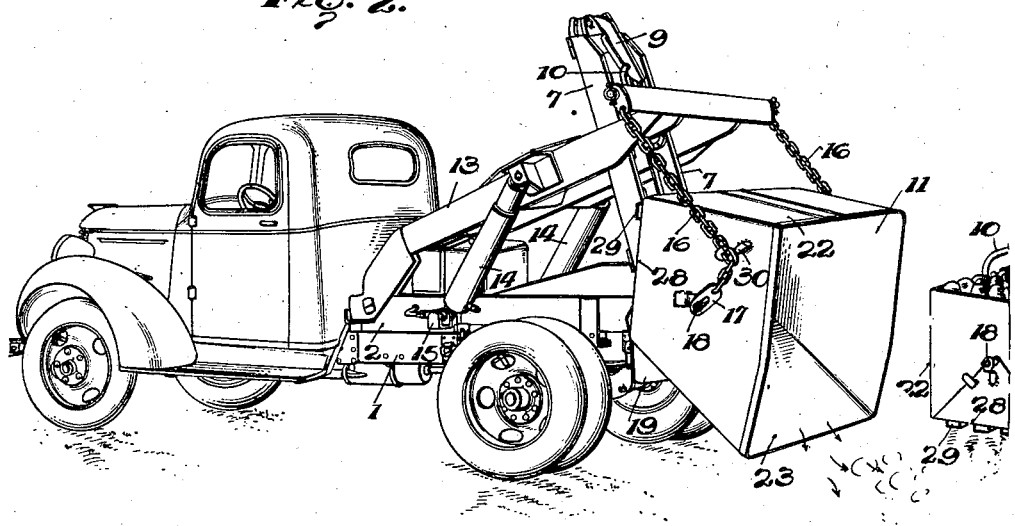
Fig. 2 is an elevation of said embodiment with the parts in dumping position.

After container 11 has been dumped boom 13 is raised righting container 11 and container 11 may then be moved forward on the chassis to the position as shown in Fig. 1, as above described, and returned to the point where the container is to be refilled, at which point it may be lowered to the ground.

When it is desired to use the transporting and dumping device of the present invention for purposes other than transporting a suitable container, such as container 11, and particularly when it is desired to use the transporting and dumping device of the present invention with any desired type of vehicular body, skid traveler 3 and skid frames 7 are moved to their forward position on the chassis and bolts 6' are removed. Skid frames 7 are then rotated about pivots 6 to a position extending along and between the angle bars 2—2 (Fig. 3). Boom 13 is then lowered to a position extending along and upon the top of angle bars 2—2, the upper surfaces of boom 13 providing a stable horizontal surface for receiving a suitable vehicular body.

A suitable vehicular body for use with the transporting and dumping device of the present invention when disposed as above described with reference to Fig. 3 is shown in position in Fig. 4 and shown in detail in Fig. 11. The body illustrated in these figures is suitable for transportation of passengers or workmen.

It is to be expressly understood that the use of any other suitable body for any other purpose with the transporting and dumping device of the present invention is within the scope of the present invention.

Figure 4:
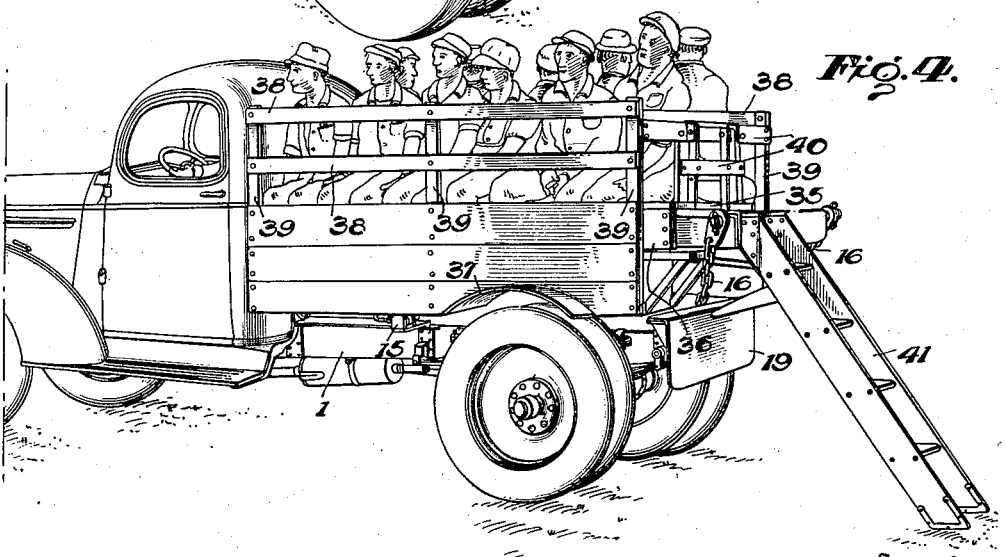
Fig. 4 is a view of said embodiment with a suitable vehicular body in place.

The body illustrated in Figs. 4 and 11 comprises a portion 35 adapted to rest upon the upper surfaces of boom 13 and as here shown to provide a suitable seat for the transportation of passengers. This body is provided with downwardly extending portions 36 adapted to overhang the sides of boom 13, angle bars 2 and chassis rails 1. These downwardly extending portions 36 are provided with suitable wheel wells 37. As shown in Figs. 4 and 11 these downwardly extending portions 36 are utilized to provide foot room for the passengers. The body may also be provided with suitable side elements 38 supported upon uprights 39 and may also be provided with suitable end closing members 40. A ladder 41 designed to engage the end of boom 13 may also be provided to assist the passengers in mounting the vehicle.

The body is secured to boom 13 by suitable anchor bolts 42 shown in detail in Figs. 14 and 15. Anchor bolts 42 are located at positions 43 and 44 (Fig. 11). Anchor bolts 42 embrace boom arms 13 and pass through suitable cross members 45 of the body and are secured thereto as by nuts 47. Suitable anti-shift pins may also be used in conjunction with anchor bolts 42 to secure the body in position. These anti-shift pins are located at positions 49 (Fig. 11) and comprise suitable pins 48 welded to the inside of angle bars 2 and extending above the top of angle bars 2. Cross member 46 of the vehicle body has plates 50 welded thereto. Plates 50 are recessed or apertured at 51 and are so positioned that when the vehicle body is in place pins 48 will pass through the apertures 51 and fit in close engagement therewith. Anti-shift pins 48 are a safety feature to protect the cab of the vehicle in case the anchor bolts 42 become loosened. With shift pins 48 in position the body can shift neither forwardly nor rearwardly.

While for the purpose of illustrating the invention cylinders 5 and 14 are here shown as the power mechanism for moving the skid traveler 3 and for controlling the elevating and lowering movements of boom 13, it will be understood that such cylinders are illustrative of any suitable power mechanism for performing this function and that the invention is not limited to the means shown.

It is also to be understood that by the term angle bar as herein used is meant any suitable bar having longitudinally extending members arranged at an angle one to the other, so that in a cross section of a bar the members would be shown as arranged at an angle to each other.

It is further to be understood that any suitable type of vehicle body may be used with the transporting and dumping device of the present invention and that these vehicular bodies may be secured in place in any suitable or desirable way.

It is also to be understood that the present invention is not limited to the use of a tip-dump type of container but may be used with any desirable type of container.

Having thus described the invention, what is claimed is:

1. In a transporting vehicle, the combination of a track or way extending forward from the rear end of the vehicle above and across the rear axle thereof, a skid traveler movable forward and backward along said track or way, skid frames pivotally mounted on said skid traveler, means normally securing said skid frames to said skid traveler in an upwardly extending direction, power means for imparting movement to said skid traveler, a boom pivoted forward of said track and extending rearward to said skid frames, means for swinging said boom on its pivot to move a container up and down in contact with said skid frames, and connections from the rear end of said boom for said container whereby said container may be moved along said skid frames.

2. In a transporting and dumping vehicle including a truck chassis, a boom pivoted thereto forward of the rear end of the chassis and swinging in a vertical plane, a skid traveler mounted to travel back and forth across and above the rear axle of the truck, means for imparting said movements thereto, skid frames pivotally mounted on said skid traveler and normally secured thereto in an upwardly extending direction, said skid frames being movable about their pivots into a lowered position on said chassis, means for connecting the rear end of said boom to a container, and means on said skid frames for engaging and supporting said container in elevated position on said skid frames.

3. In a transporting vehicle, the combination of a skid traveler, skid frames mounted on said skid traveler and secured thereto in an upwardly extending direction for cooperation with a container, means for moving said skid traveler rearwardly over the rear axle of the vehicle, said skid traveler being movable forwardly of said axle by the weight of said container acting on said skid frames, and pivoted power actuated means for elevating said container along said skid frames.

4. In a transporting and dumping vehicle including a truck chassis, a boom pivoted thereto forward of the rear end of the chassis and swinging in a vertical plane extending longitudinally of the vehicle into a lowered position on said chassis, a skid traveler mounted to move rearwardly above the rear axle of the truck, means for imparting said movement thereto, skid frames pivotally mounted on said skid traveler and swinging in a vertical plane extending longitudinally of the vehicle into a lowered position on said chassis, means for normally securing said skid frames to said skid traveler in an upwardly extending direction for cooperation with a container, and means for connecting said boom to said container.

5. In a transporting vehicle, the combination of a skid traveler, skid frames connected thereto and secured in an upwardly extending direction, means moving said skid traveler over the rear axle of the vehicle, said skid traveler being movable forwardly of said axle by the weight of a container acting on said skid frames, a power actuated boom for elevating said container along said skid frames, and means for engaging and supporting said container in an elevated position on said skid frames.

6. In a transporting vehicle including a truck chassis, a power actuated boom comprising parallel arms pivoted on the vehicle forward of the rear end of the chassis and swinging in vertical planes extending longitudinally of the vehicle into a lowered position on said chassis, a skid traveler mounted on the vehicle, skid frames pivotally mounted on said skid traveler and normally secured thereto in an upwardly extended direction but movable into a lowered position on said chassis, a container-engaging catch on the upper part of said skid frames, and means for connecting the arms of said boom with opposite sides of said container.

7. In a transporting and dumping vehicle, the combination of a track or way, a container having a bottom, end and rear and front walls, a pivot around which said container turns to dump its contents secured to said bottom and arranged parallel to said rear wall, a bail connected to said pivot and extending along the bottom and above the back wall of said container, recesses in said back wall to receive said bail, means for raising and lowering said container with its back wall sliding along said track or way and a catch engaging and supporting said bail when said container is in elevated position.

8. A container having a bottom, end and rear walls and an upwardly and outwardly extending front wall, a pivot secured to said bottom spaced from and parallel to said rear wall, a bail engaging said pivot and extending along said bottom and along said rear wall and recesses in said rear wall to receive said bail whereby the weight of the container resting upon said bottom extending portions of said bail when on the ground will hold said bail in said recesses.

9. In a transporting and dumping vehicle, the combination of a track or way, a container having a bottom, end and rear walls and an upwardly and outwardly extending front wall, the length of said container transverse of the vehicle being greater than the distance between the rails of said track or way, means detachably connected to the end walls of said container for raising and lowering said container with its back wall sliding along said track or way, means on said vehicle for holding said container in elevated position, and a bail pivotally engaging the bottom of said container and extending along the bottom and along and above the rear wall of said container and engaging said holding means when said container is in elevated position, whereby said container can be rotated about said pivot to dump said container when said container is in elevated position.

10. In a transporting and dumping vehicle, including a truck chassis, a boom pivoted thereto forward of the rear end of the chassis and swinging in a vertical plane into a lowered position on said chassis, a skid traveler mounted to travel back and forth across and above the rear axle of the truck, and skid frames pivotally mounted on the skid traveler, for movement into a lowered position on said chassis, said boom and skid frames adapted to receive a vehicle body carried by the chassis and secured to the boom when the boom and the skid frames are lowered onto the chassis.

11. In a transporting and dumping vehicle, including a truck chasses, a boom pivoted thereto forward of the rear end of the chassis and adapted to be moved to extend along the chassis when in lowered position, a skid traveler mounted to travel back and forth across and above the rear axle of the truck, and skid frames pivotally mounted on the skid traveler and adapted to be moved to extend along the chassis when in lowered position, said boom and skid frames adapted to receive a vehicular body resting upon the boom and secured thereto when in lowered position with downwardly extending proportions on said vehicular body embracing the sides of the boom and the chassis.

12. In a transporting and dumping vehicle, including a truck chassis, angle bars mounted on the side rails of the chassis, a skid traveler mounted to travel back and forth along the angle bars, skid frames pivotally mounted on the skid traveler and adapted to be moved to extend between the angle bars when in lowered position, and a boom pivoted to the angle bars forward of the rear end of the chassis and adopted to be moved to extend along the angle bars when in lowered position, said boom and skid frames adopted to receive a vehicular body designed to rest upon the boom when in lowered position and said boom having means cooperating with means on said vehicular body to prevent longitudinal movement of said vehicular body.

13. In a transporting and dumping vehicle, including a truck chassis, angle bars mounted on the side rails of the chassis, a skid traveler mounted to travel back and forth along the angle bars, skid frames pivotally mounted on the skid traveler and adapted to be moved to extend between the angle bars when in lowered position, and a boom pivoted to the forward end of the angle bars and adapted to be moved to extend along the angle bars when in lowered position, said boom and skid frames adapted to receive a vehicular body resting upon the boom when in lowered position, with means for locking said body to the boom.

14. In a transporting vehicle, the combination of a skid traveler, skid frames mounted on said skid traveler and secured thereto in an upwardly extending direction for cooperation with a container, means for moving said skid traveler rearwardly over the rear axle of the vehicle, pivoted power actuated means for elevating said container along said skid frames and forwardly sloping means secured to said vehicle and adapted to receive said container when in transporting position to distribute the weight of said container against said skid frames and said vehicle.

15. In a transporting and dumping vehicle including a truck chassis, angle bars mounted on the side rails of said chassis, forwardly sloping elements mounted on the rear end of said angle bars, a skid traveler mounted to travel back and forth along said angle bars, skid frames pivotally mounted on said skid traveler and designed to extend between said angle bars and said forwardly sloping elements when in lowered position, a boom pivoted on said angle bars forward of the rear end of said chassis and designed to extend along said angle bars and receive said forwardly sloping elements when in lowered position and a vehicular body designed to rest upon said boom when in lowered position.

16. In a transporting and dumping vehicle including a truck chassis, angle bars mounted on the side rails of said chassis, forwardly sloping elements formed at the rear ends of said angle bars, a skid traveler mounted to travel back and forth along said angle bars, skid frames pivotally mounted on said skid traveler and designed to extend between said angle bars and said forwardly sloping elements when in lowered position, and a boom pivoted on said angle bars forward of the rear end of said chassis and designed to extend along said angle bars and receive said forwardly sloping elements when in lowered position, said forwardly sloping elements being so constructed and arranged as to distribute the weight of the container and contents when in transporting position between said skid frames and said angle bars.

17. In a transporting and dumping vehicle including a truck chassis, angle bars mounted on the side rails of said chassis, upwardly extending and forwardly sloping elements formed at the rear ends of said angle bars, a skid traveler mounted to travel back and forth along said angle bars, skid frames pivotally mounted on said skid traveler and designed to extend between said angle bars and said upwardly extending and forwardly sloping elements when in lowered position, and a boom pivoted on said angle bars forward of the rear end of said chassis and designed to extend along said angle bars and receive said upwardly extending and forwardly sloping elements when in lowered position, said boom being so constructed and arranged as to provide a suitable support for a vehicular body when in lowered position.

GEORGE R. DEMPSTER.